United States Patent [19]

Howard

[11] Patent Number: 5,038,157

[45] Date of Patent: Aug. 6, 1991

[54] APPARATUS AND METHOD FOR LOADING SOLID INK PELLETS INTO A PRINTER

[75] Inventor: Robert A. Howard, Mountain View, Calif.

[73] Assignee: Apple Computer, Inc., Cupertino, Calif.

[21] Appl. No.: 395,622

[22] Filed: Aug. 18, 1989

[51] Int. Cl.[5] .......................... G01D 15/16; B41J 2/17

[52] U.S. Cl. ................................ 346/140 R; 400/126

[58] Field of Search .................. 346/1.1, 140; 400/126

[56] References Cited

U.S. PATENT DOCUMENTS 4,739,339 4/1988 DeYoung et al. ........... 346/140 PD

*Primary Examiner*—Mark J. Reinhart

*Attorney, Agent, or Firm*—Mark Aaker

[57] ABSTRACT

A printer using meltable solid ink pellets loaded into a reservoir in which a holder with an attached solid ink pellet is inserted through a doorway for access to the reservoir and a release mechanism within the reservoir releases the ink pellet from the holder by engagement of the ink and release mechanism. The holder surrounds the pellet on all but one end and includes keyed projections on the holder for matching to keyed slots on said doorway, such that only a matching keyed holder will pass through said doorway. The keyed projections on the holder are used to open the doorway. The release mechanism includes a bore for receiving and restraining the pellet against rotation of the holder, or can include a thin chisel for severing the connection of the pellet to the holder.

10 Claims, 4 Drawing Sheets

APPARATUS AND METHOD FOR LOADING SOLID INK PELLETS INTO A PRINTER

BACKGROUND OF THE INVENTION

This invention relates to a printer, such as an ink jet printer, which uses solid ink pellets loaded into a reservoir, and melts the pellets as needed to provide ink. Solid ink pellets are easier to handle and less likely to spill and stain an operator or the surrounding environment than are liquid or powder forms of ink.

It is known to put solid ink pellets within a holder or cartridge to prevent the pellet from contacting the operator or surrounding surfaces, and to prevent contaminating the pellet with foreign material. Pellets are then transferred from the cartridge into a reservoir, where the pellet can be melted to provide liquid ink as needed by the printer. For example, U.S. Pat. No. 4,739,339 to DeYoung et al. shows a cartridge for retaining a pellet until the cartridge is inserted into a receiving means and rotated to release the pellet. This cartridge uses retractable retaining fingers formed on a retaining ring to hold the pellet within the cartridge. This cartridge requires detailed mechanical assembly and close mechanical tolerances between its parts for its rotating and retracting operation. A simpler cartridge and release mechanism is desired.

SUMMARY OF THE INVENTION

This invention provides a simple and inexpensive method of transferring a solid ink pellet from a holder to a reservoir within a printer. A solid ink pellet is attached to a holder. The holder and pellet are inserted through a doorway to engage the pellet with a release mechanism within the reservoir. The release mechanism severs the pellet from the holder, allowing the pellet to remain in the reservoir as the holder is withdrawn.

The holder does not require moving mechanical parts and is inexpensive enough for disposal after a single use. The doorway and a door automatically cover and protect the reservoir when the holder is removed. Where multiple colors or kinds of inks with separate reservoirs are used, the holders can be keyed to match specific doorways in order to prevent loading of incorrect pellets.

DETAILED DESCRIPTION

Figure 1:
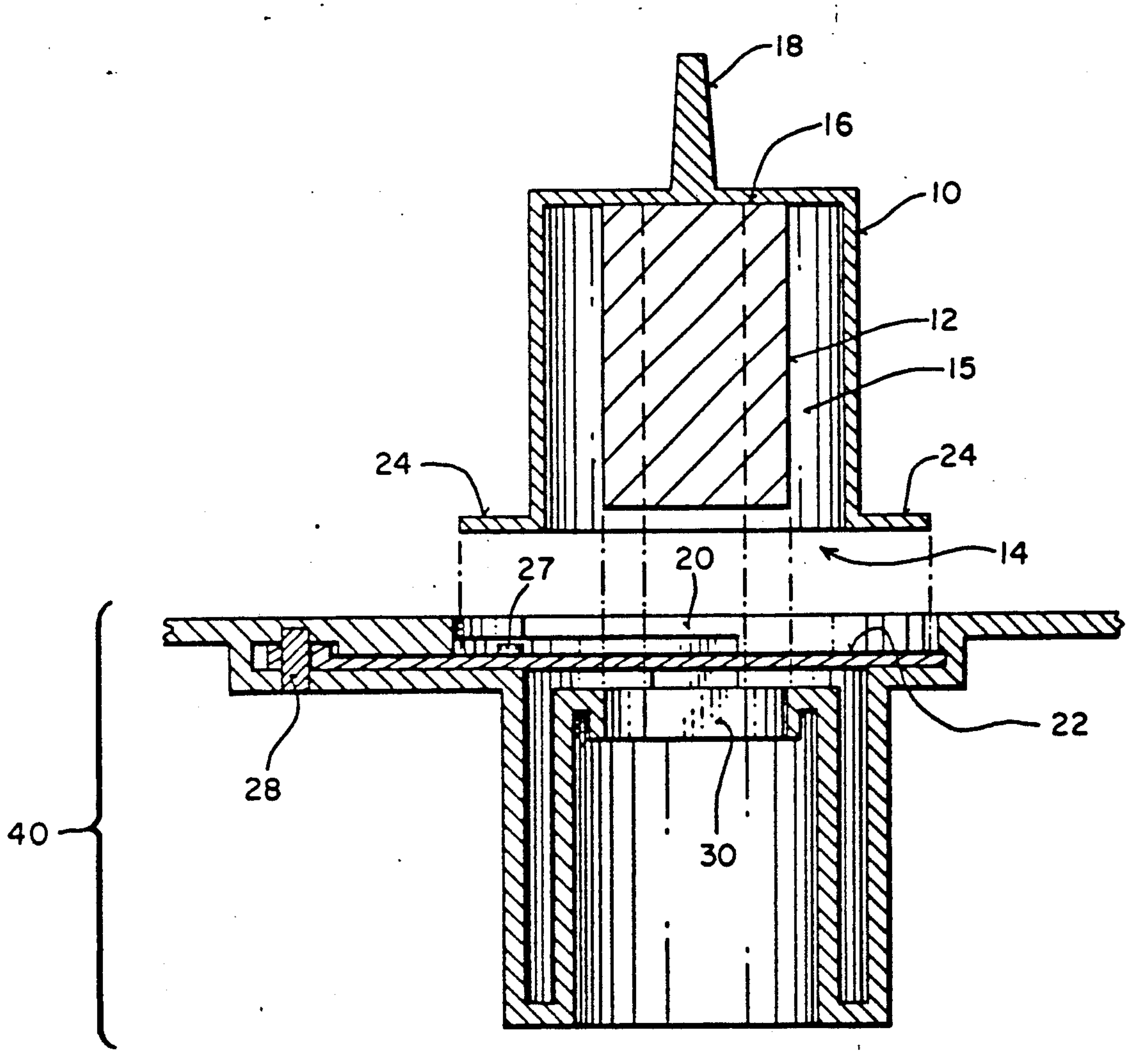
FIG. 1 shows a cross-sectional view of a first embodiment of a holder and the doorway and ink reservoir area of a printer in accordance with the invention.
Figure 2:
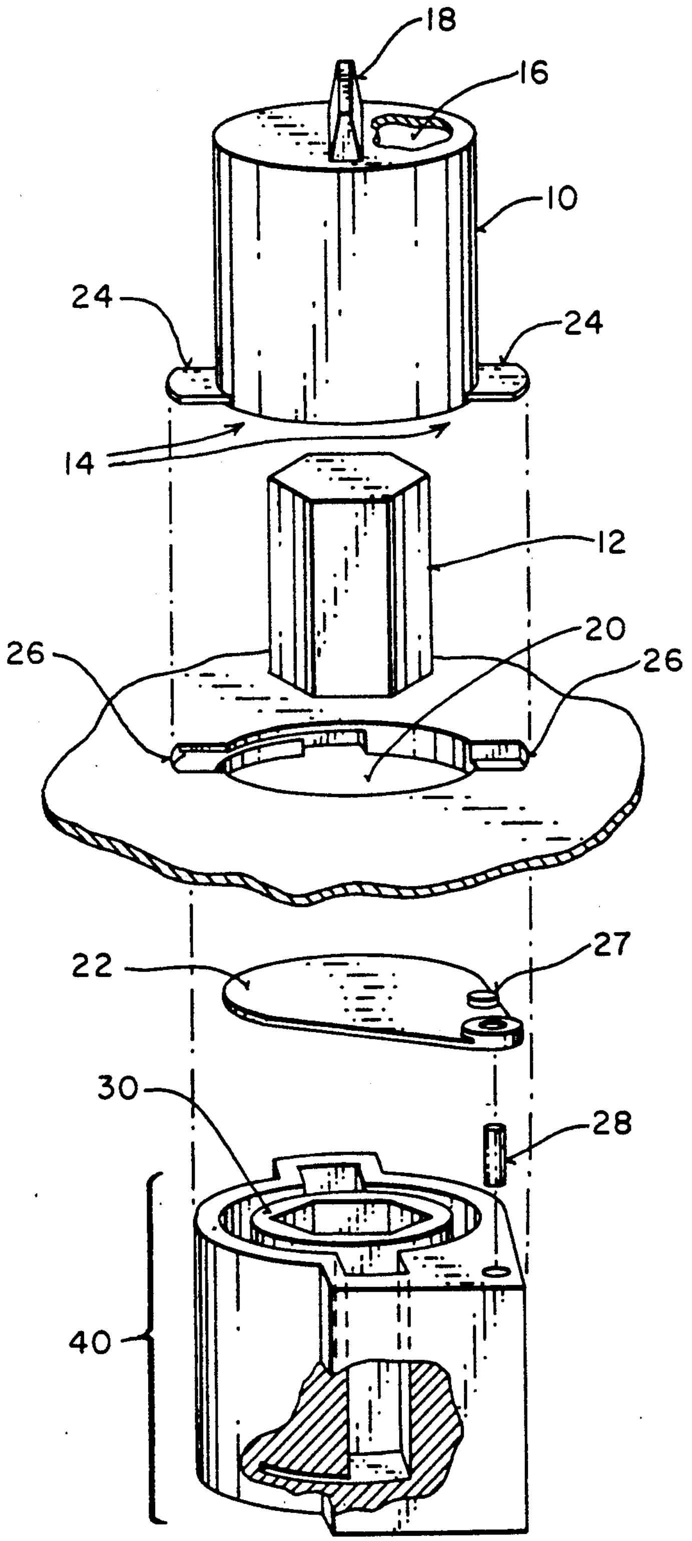
FIG. 2 shows an exploded view of the same embodiment as FIG. 1.
Figure 3A:
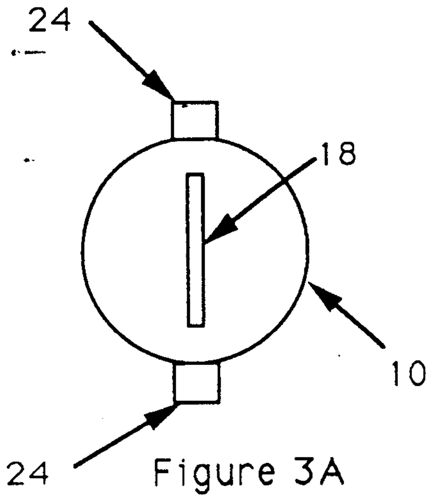
FIG. 3 shows how different orientations of keyed projections 24 can be used to distinguish holders containing different colors or types of ink.
Figure 3B:
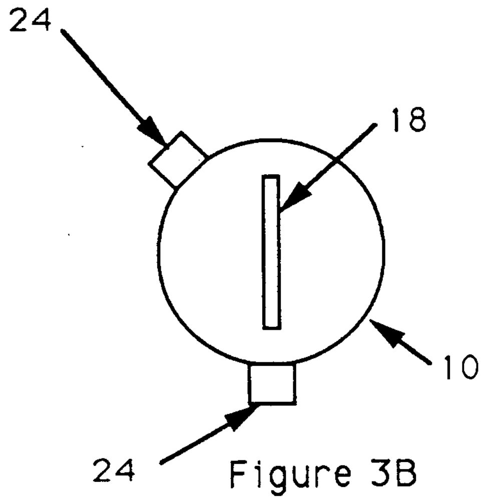
Figure 3C:
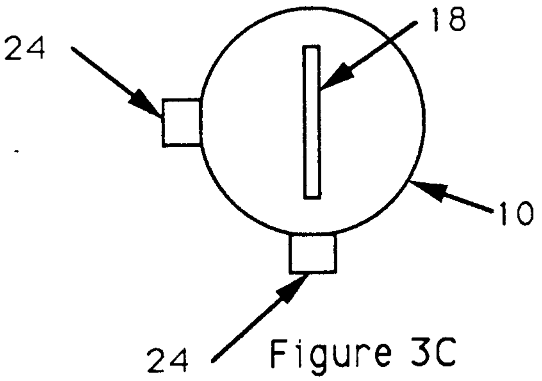
Figure 3D:
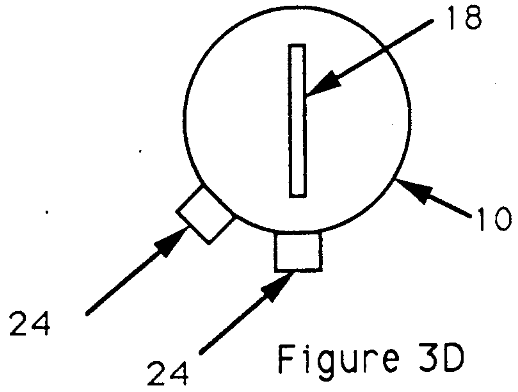

FIG. 1 shows a cross-sectional view of a first embodiment of a holder and the doorway and ink reservoir area of a printer in accordance with the invention. FIG. 2 shows an exploded view of the same embodiment as FIG. 1. Between FIGS. 1 and 2, parts are similarly numbered.

A solid ink pellet 12 is fastened within a holder 10. The holder 10 and pellet 12 are inserted through a doorway 20 to engage the pellet 12 with a release mechanism 30 within the reservoir 40. The release mechanism 30 severs the pellet 12 from the holder 10, allowing the pellet 12 to remain in the reservoir 40 as the holder 10 is withdrawn.

In the embodiment of FIGS. 1 and 2, the pellet 12 is formed as a hexagonal bar surrounded by a tubular holder 10. The pellet is formed as a non-circular form with distinct edges, such as a hexagonal bar, in order to provide distinct mechanical engagement of the pellet 12 with the release mechanism 30. In other embodiments, other shapes such as tubes or cylinders can be used with different release mechanisms. It is desirable to use a form giving the maximum volume of ink, for example, a hexagonal rather than triangular bar, within the same diameter holder.

Holder 10 is a cylinder or tube axially surrounding but spaced outward from the pellet 12, leaving a small air gap 15. The holder 10 has an open end 14 and a closed end 16, thereby surrounding the pellet 12 on all but one end. At open end 14, a near end of pellet 12 can be accessed. At closed end 16, the far end of pellet 12 is fastened to holder 10. The far end of pellet 12 can be fastened to holder 10 by several means, such as an adhesive, or by solidifying the far end of the pellet 12 onto the closed end 16 of the holder 10, or by mechanical fastening such as a screw thread. A handle 18 can be formed on the outside surface of the holder 10 at closed end 16. It can be seen that this form of holder 10 has no moving mechanical parts and does not require a detailed mechanical assembly procedure. The holder can be easily formed in molded plastic. It can also be seen that, unlike previous cartridges, the pellet is fixed within the holder and cannot be damaged by banging about within the holder, which creates loose particles which can stain the operator or environment, or can contaminate other ink reservoirs.

In a preferred form, doorway 20 is formed in an exterior panel such as a top surface of the printer and is normally closed, blocked or covered by a movable door 22. Keyed projections 24 are formed on the outer surface of the open end 14 of holder 10. Matching keyed slots 26 in the outer circumference of doorway 20 allow only a correctly keyed and oriented holder 10 to pass through the doorway 20.

FIG. 3 shows how different orientations of keyed projections 24 can be used to distinguish holders containing different colors or types of ink. In this way, where multiple colors or kinds of inks with separate reservoirs are used, the holders can be keyed to match specific doorways in order to prevent loading of incorrect pellets. Note that in the particular pattern of keyed projections shown in FIG. 3, only one projection moves around the circumference, while the other projection remains in a fixed reference position. Clearly, other patterns or additional projections can be used to achieve other distinct codings of holders. Projections and their functions could be located and performed elsewhere on the holder and doorway, so long as they do not interfere with other operations such as the release mechanism 30.

Movable door 22 can be released for opening by requiring a keyed projection 24, such as the projection in a fixed reference position, to enter a keyed slot 26, and then by rotating the holder 10, to force the keyed projection 24 against a drive pin 27. The force of keyed projection 24 against drive pin 27 will swivel door 22 to the side, swiveling about a swivel pin 28. Of course, other door, latch, and swivel mechanisms can be used to move door 22. The same or separate projections can be used for keying, for releasing a latch, and for opening the door. A latch may be used rather than relying on spring tension to keep the door closed. Other specific shapes and methods may be preferred depending on the size and shape of holders used, and on the available space on the printer surface and within its reservoir area. The swivel mechanism can be spring loaded to automatically close the door 22 when the holder 10 is removed.

With the door 22 opened, the holder 10 can be further inserted through doorway 20 into reservoir 40. During insertion the holder can be guided by having keyed projections 24 travel within slots or guides within the reservoir 40. During this insertion, a release mechanism 30 engages the pellet 12, for example by sliding up into the gap 15 between the pellet 12 and holder 10. At full insertion, the release mechanism 30 within the reservoir 40 severs the ink pellet 12 from the holder 10. For example, the release mechanism 30 can be a bore for receiving the pellet 12 which is closely formed to the external shape of the pellet 12. For example, a hexagonal pellet 12 can slide into a long hexagonal hole. Then, if the holder 10 is rotated, the restraining action of the bore upon the pellet will result in ink pellet 12 being sheared from the holder 10, freeing the pellet from the holder so that the pellet will remain within the reservoir 40. In this method, the pellet 12 can be formed with a weakened or narrowed construction near the shear point to provide reliable separation. Other pellet and bore shapes can be used that will provide an interlocking and support action along their length, leading to shearing at the first unsupported point along the pellet 12.

Figure 4:
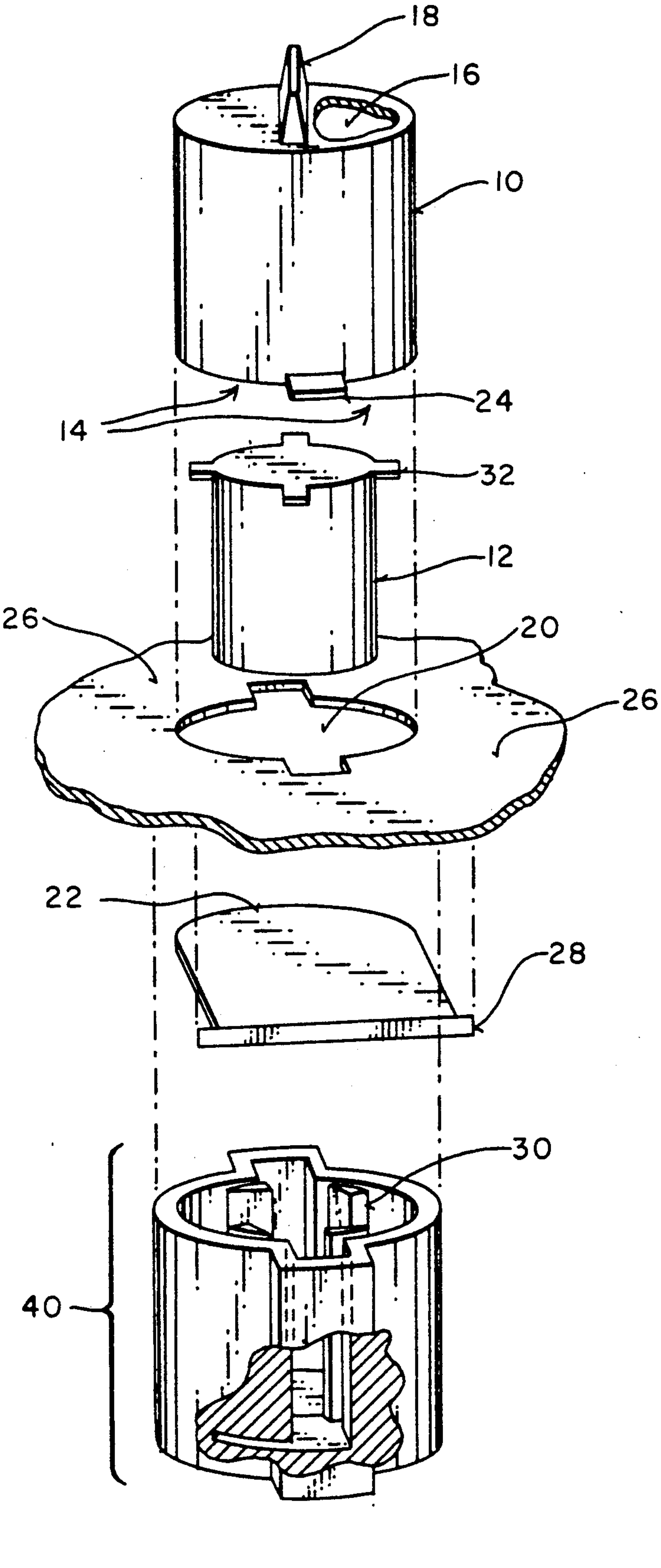
FIG. 4 shows a second embodiment of a holder and the doorway and ink reservoir area of a printer in accordance with the invention.

FIG. 4 shows a second embodiment of a holder and the doorway and ink reservoir area of a printer in accordance with the invention. In this second embodiment, an altenative door 22 and an alternative release mechanism 30 are shown. Door 22 rotates about a long horizontal hinge pin 28. This requires sufficient space below the door 22 for it to swivel downward. Solid ink pellet 12 is formed with spokes 32 of material reaching across the gap 15 from the pellet 12 to the inside walls of the holder 10. The ends of spokes 32 are fastened to the inside walls of holder 10 by adhesive or solidification as previously described. The alternative release mechanism 30 comprises long narrow chisels or blades which slide up the gap 15 between the holder 10 and pellet 12 during insertion of the holder 10 into the reservoir 40. At full insertion, the spokes 32 are severed by the chisels by rotating the holder to drive the chisels through the spokes 32, releasing the pellet 12 from the holder 10. Other forms of interaction between the pellet 12 and the release mechanism 30 can be used, and specific other forms may be preferred depending on the hardness of the ink pellets and the mounting and support method within the holder.

It should be noted that in either of the embodiments shown, and in the invention as claimed, release of the pellet occurs by engagement of the release mechanism with the pellet, rather than with the holder. This provides a more direct and reliable mechanical release mechanism than in the intervening mechanical parts and operations of previous cartridges.

These and other embodiments can be practiced without departing from the true scope and spirit of the invention, which is defined by the following claims.

What is claimed is:

1. An apparatus for severing a meltable solid ink pellet from a holder to leave said pellet to reside in a reservoir comprising:

a movable doorway through which said holder and a connected said pellet pass to enter said reservoir; and a release mechanism within said reservoir adapted for engaging said pellet and severing said connection of said pellet to said holder;

wherein, said holder and connected pellet are inserted through said doorway, and said release mechanism engages said pellet to sever said pellet from said holder.

2. An apparatus as in claim 1 further comprising:

at least two keyed projections on said holder, said keyed projections having a specific predetermined size and spacing; and at least two keyed slots on said doorway, said keyed slots having same said specific predetermined size and spacing;

wherein only a said holder having said keyed projections matching said keyed slots will pass through a said doorway.

3. An apparatus as in claim 2 further comprising a drive pin on said door for engagement by a said keyed projection on said holder to open said doorway.

4. An apparatus as in claim 1 wherein said release mechanism comprises a bore for receiving said pellet closely formed to the external shape and size of said pellet, for engaging said pellet and severing said connection of said pellet to said holder by rotation of said holder and restraint of said pellet by the interior walls of said bore.

5. An apparatus using a meltable solid ink pellet loaded from a holder into a reservoir comprising:

a doorway for access to said reservoir; and a release mechanism within said reservoir for releasing said ink pellet from said holder by engagement of said ink pellet and said release mechanism, said release mechanism comprising a chisel for severing a connection of said pellet to said holder, said chisel moving through said connection by rotation of said holder.

whereby, said holder is inserted through said doorway, and said pellet engages said release mechanism to release said pellet to said reservoir.

6. A method of severing a solid ink pellet from a holder to reside in a reservoir, said method comprising:

inserting said holder and a connected said pellet through a doorway into said reservoir;

engaging said pellet to a release mechanism within said reservoir; and using said release mechanism to sever said connection of said pellet to said holder, thereby releasing said pellet to remain within said reservoir.

7. A method as in claim 6 wherein inserting further comprises matching at least two keyed projections on said holder of predetermined size and spacing to at least two keyed slots on said doorway of same said predetermined size and spacing.

8. A method as claim 7 further comprising engaging a said keyed projection against a drive pin on said doorway to open said doorway.

9. A method as in claim 6 wherein:

said step of engaging comprises sliding said pellet into a matching bore within said reservoir closely formed to the external shape and size of said pellet; and said step of using said release mechanism comprises rotating said holder and restraint of said pellet by the interior walls of said bore until the connection of said pellet to said holder is severed.

10. A method of loading a solid ink pellet mounted in a holder into a reservoir comprising:

inserting said holder and a connected said pellet through a doorway into said reservoir;

engaging said pellet to a release mechanism within said reservoir, wherein said engaging comprises sliding a chisel into said holder; and releasing said pellet to remain within said reservoir, wherein said releasing comprises rotating said holder to sever said connection of said pellet to said holder by movement of said chisel through said connection.

* * * * *